(12) United States Patent
Crabb et al.

(10) Patent No.: US 7,312,830 B2
(45) Date of Patent: Dec. 25, 2007

(54) DECODING INFORMATION FOR INTERLACED TO PROGRESSIVE SCAN CONVERSION

(75) Inventors: Michael Evan Crabb, Carmel, IN (US); Donald Henry Willis, Indianapolis, IN (US)

(73) Assignee: Thomson Licensing, Boulogne-Billancourt (FR)

( * ) Notice: Subject to any disclaimer, the term of this patent is extended or adjusted under 35 U.S.C. 154(b) by 423 days.

(21) Appl. No.: 10/451,606

(22) PCT Filed: Dec. 18, 2001

(86) PCT No.: PCT/US01/48786
§ 371 (c)(1),
(2), (4) Date: Jan. 14, 2004

(87) PCT Pub. No.: WO02/51144
PCT Pub. Date: Jun. 27, 2002

(65) Prior Publication Data
US 2004/0130660 A1 Jul. 8, 2004

Related U.S. Application Data

(60) Provisional application No. 60/256,804, filed on Dec. 20, 2000.

(51) Int. Cl.
*H04N 7/01* (2006.01)
*H04N 11/20* (2006.01)

(52) U.S. Cl. ..................................... 348/448

(58) Field of Classification Search ........ 348/448–452, 348/459, 441, 513, 514, 526, 558, 554–556
See application file for complete search history.

(56) References Cited

U.S. PATENT DOCUMENTS

| 4,641,188 | A | * | 2/1987 | Dischert | 348/448 |
| 4,661,798 | A | * | 4/1987 | Ohtsu | 345/10 |
| 4,665,437 | A | | 5/1987 | Nicholson | 358/148 |
| 4,720,744 | A | * | 1/1988 | Washi et al. | 348/469 |
| 4,881,125 | A | | 11/1989 | Krause et al. | |
| 5,532,749 | A | | 7/1996 | Hong | 348/449 |
| 5,801,777 | A | | 9/1998 | Lyu et al. | |
| 6,337,716 | B1 | | 1/2002 | Yim | 348/554 |

FOREIGN PATENT DOCUMENTS

| EP | 0645750 A | 3/1995 |
| EP | 0715455 A | 6/1996 |
| JP | 61-054776 | 3/1986 |
| JP | 04-196713 | 7/1992 |
| JP | 11-220702 | 8/1999 |

* cited by examiner

*Primary Examiner*—M. Lee
(74) *Attorney, Agent, or Firm*—Joseph L. Laks; Harvey D. Fried; Joel M. Fogelson

(57) ABSTRACT

A method of converting interlaced video to progressive video can include a series of steps. The method can include receiving a video signal representative of at least one picture and determining whether the picture is progressive. If the picture is progressive, a vertical synchronization signal is modified to create an association with a first field of the picture. Accordingly, a progressive video signal can be converted to an interlaced video signal associated with the vertical synchronization signal and the interlaced video signal can then be converted to a progressive video signal in correspondence with modifications made to the vertical synchronization signal.

16 Claims, 3 Drawing Sheets

DECODING INFORMATION FOR INTERLACED TO PROGRESSIVE SCAN CONVERSION

This application claims the benefit under 35 U.S.C. § 365 of International Application PCT/US91/48786 filed Dec. 18, 2001, which claims the benefit of U.S. Provisional Application No. 60/256,804 filed Dec. 20, 2000.

BACKGROUND OF THE INVENTION

1. Technical Field

This invention relates to the field of decoding Moving Picture Experts Group (MPEG) images, and more particularly, to a method and system for transferring information used in the decoding of an MPEG video sequence from the decoder hardware to an external device for use in converting interlaced video to progressive video.

2. Description of the Related Art

When a deinterlacer is operating on a Moving Picture Experts Group (MPEG) decoded signal, it can perform a perfect deinterlacing of progressive pictures. This, however, is conditioned upon knowing which field begins a picture. To properly convert the interlaced video to progressive video, this information needs a method of transfer from the MPEG decoder to the deinterlacing unit.

In the past, the deinterlacer did not use this information; or if the deinterlacer was within the same integrated circuit as the MPEG decoder this information did not have to be provided to the deinterlacer.

Attempts have been made to enable deinterlacers to independently determine which field begins a picture. For example, some deinterlacers attempt to analyze the video signal pixels to determine this information. This analysis, however, is complicated and can be error prone. Thus, a need exists for a deinterlacer and method that overcomes the detriments described above.

SUMMARY OF THE INVENTION

The invention disclosed herein provides a method and system for transferring information for use in converting interlaced video to progressive video. In particular, when progressive pictures are decoded in a Moving Picture Experts Group (MPEG) decoder, the vertical synchronization signal can be selectively pulse width modulated to indicate to the deinterlacer when a first field of a progressive picture is being transmitted.

One aspect of the present invention can include a method of converting interlaced video to progressive video. The method can include receiving a video signal representative of at least one picture and determining whether the picture is progressive. If the picture is progressive, a vertical synchronization signal associated with a first field of the picture can be modified. Further processing of the video signal can then be performed in response to the modification to the vertical synchronization signal. Further processing can comprise converting the video signal to an interlaced video signal associated with the vertical synchronization signal and further converting the interlaced video signal to a progressive video signal in response to modifications made to the vertical synchronization signal.

Another embodiment of the invention can be a method of converting interlaced video to progressive video where an MPEG 2 video data stream can be received. The MPEG 2 video data stream can contain at least one picture. The method can include determining whether the picture is progressive. If so, a first field of the picture can be identified. A vertical synchronization signal can be selectively pulse width modulated to create an identifier associated the first field. The MPEG 2 video data stream can be converted to an interlaced video signal, which can then be converted to a progressive signal in correspondence with modifications made to the selectively pulse width modulated signal.

Another aspect of the invention can include a system for converting interlaced video to progressive video. The system can include a decoder which can convert a received MPEG 2 video data stream to an interlaced video signal. The MPEG 2 video data stream can specify at least a first field of a picture. The decoder further can produce a vertical synchronization signal which is selectively pulse width modulated to identify the first field. A deinterlacer can be included which can convert the interlaced video signal to a progressive video signal based upon the selectively pulse width modulated vertical synchronization signal. Additionally, the system can include a processor which can coordinate the decoder and the deinterlacer.

BRIEF DESCRIPTION OF THE DRAWINGS

There are shown in the drawings embodiments which are presently preferred, it being understood, however, that the invention is not so limited to the precise arrangements and instrumentalities shown.

DETAILED DESCRIPTION

The invention disclosed herein provides a method and system for transferring information for use in converting interlaced video to progressive video. More specifically, the invention provides for the transference of information obtained in the decoding of a Moving Picture Experts Group (MPEG) video sequence from the decoder hardware to an external device for use in converting interlaced video to progressive video. The method can be implemented, for example, on a high definition television (HDTV) receiver having a liquid crystal on silicon (LCOS) imager.

In one embodiment, the pulse width of a vertical synchronization (vertical sync) signal can be modified to indicate that a first field of a progressive picture is being transmitted. For example, rather than the deinterlacer independently determining which field begins a picture, the vertical sync signal can be width modulated by the MPEG decoder. Conversely, if the vertical sync signal is not width modulated, the field being transmitted is not the first field of a progressive picture.

Figure 1:
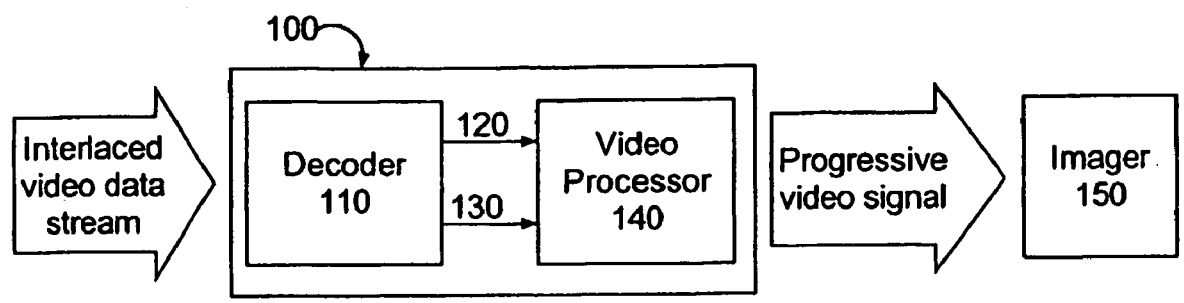
FIG. 1 is a block diagram illustrating an exemplary system for performing interlaced to progressive scan conversion.

FIG. 1 is a block diagram illustrating an exemplary scan conversion system 100 for performing interlaced to progressive scan conversion in accordance with the inventive arrangements disclosed herein. As shown in FIG. 1, the scan conversion system 100 can include a decoder 110 operatively connected to a video processor 140. For example, the decoder 110 can be an MPEG 2 video decoder module and the video processor 140 can be an interlace to progressive video processor.

An interlaced video data stream can be provided to the scan conversion system 100. The decoder 110 can process the received data stream to output analog video component signals 130 and synchronization signals 120. The synchronization signals 120 can include horizontal and vertical sync signals. In particular, the vertical sync signal can be a pulse signal having a pulse duration of T. The vertical sync signal can be modified by the decoder to include an indicator marking the start of the first field of a picture. For example, the pulse duration T can be altered in correspondence with the first field of the picture. The resulting signals 120 and 130 can be provided to the video processor 140 for conversion from an interlaced video signal to a progressive video signal. After conversion of the video signal, the resulting progressive video signal can be provided to an imager 150. Notably, the imager can be an LCOS imager for use with an HDTV receiver.

Figure 2A:
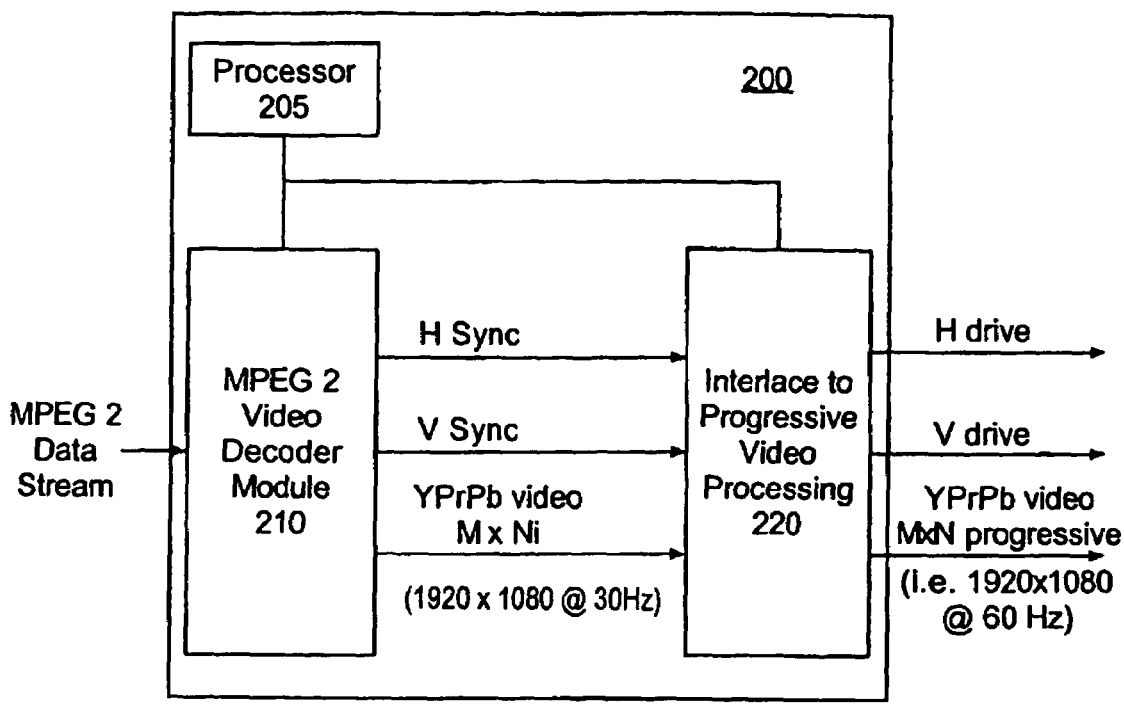
FIG. 2A is a block diagram illustrating another exemplary system for performing interlaced to progressive scan conversion.

FIG. 2A is a block diagram illustrating another exemplary scan conversion system 200 for performing interlaced to progressive scan conversion. As shown in FIG. 2A, the scan conversion system 200 can include an MPEG 2 video decoder module (MPEG decoder) 210, an interlace to progressive video processing system (deinterlacer) 220, and a processor 205. The MPEG decoder 210 can convert an MPEG 2 data stream to a video signal. The deinterlacer 220 can receive an interlaced video signal and convert that signal to a progressive video signal. The processor 205 can coordinate the actions of the MPEG decoder 210 and the deinterlacer 220. Each of the aforementioned components can be communicatively linked through an appropriate data connection, for example a data communications bus or other connection circuitry.

As shown in FIG. 2A, an MPEG 2 data stream can be received by the decoder 210. The MPEG decoder 210 can process the received data stream to produce an output. The output of the MPEG decoder 210 includes analog component video signals plus two other signals, a horizontal and a vertical sync, transmitted as an interlaced signal. The three video signals can be converted to digital signals and sent, along with the two sync signals, to the deinterlacer 220.

Figure 2B:
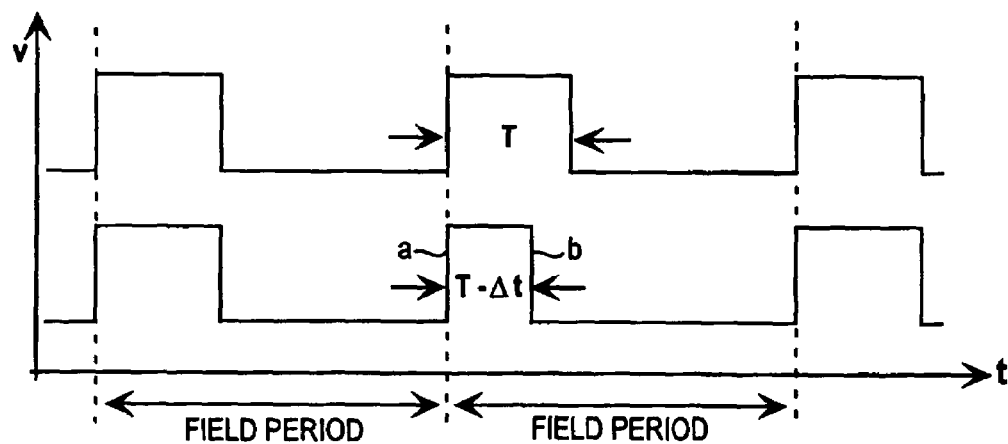
FIG. 2B illustrates inventive modulation of vertical sync pulse width to provide field identification.

The MPEG picture header bits can be parsed to determine whether the picture is progressive or non-progressive. If the bits indicate a progressive picture, then the vertical sync pulse initiating the first field of this picture is advantageously modulated accordance with the inventive arrangements such that the pulse width T of the vertical sync pulse corresponding to the first field is reduced by MPEG decoder 210. Alternatively, the pulse width can be increased. In any case, the timing of the leading edge a of the vertical sync pulse depicted in FIG. 2B is preserved to ensure proper timing of vertical synchronization with the pulse trailing b advantageously positionally modulated to indicate the first field. The MPEG decoder 210 operates under the control of the processor 205. Further, the MPEG decoder 210 is capable of changing the vertical sync pulse width on every sync pulse, if necessary. For vertical sync pulses that directly precede or correspond to a field that is not the first field of a progressive picture, the pulse width can be returned to normal. The normal pulse width can be the width of pulse corresponding to non-progressive pictures on every sync pulse.

FIG. 2B illustrates the pulse width, pulse duration or trailing edge positional difference between a normal vertical sync (V sync) signal and a vertical sync pulse advantageously modified in accordance with the inventive arrangements. In FIG. 2B the pulse width, duration or trailing edge b is shown to occur after a time interval (T-☐t) following leading edge a. In this way the shorter duration vertical sync pulse (V sync) and indicate the occurrence of a first field of a progressive or film frame to a de-interlacing circuit. The inventive arrangements contemplate not only the generation and use of the modified V sync signal as shown, but also the capacity to change between the normal V sync signal and the modified V sync signal, preferably automatically, as necessary.

Figure 3:
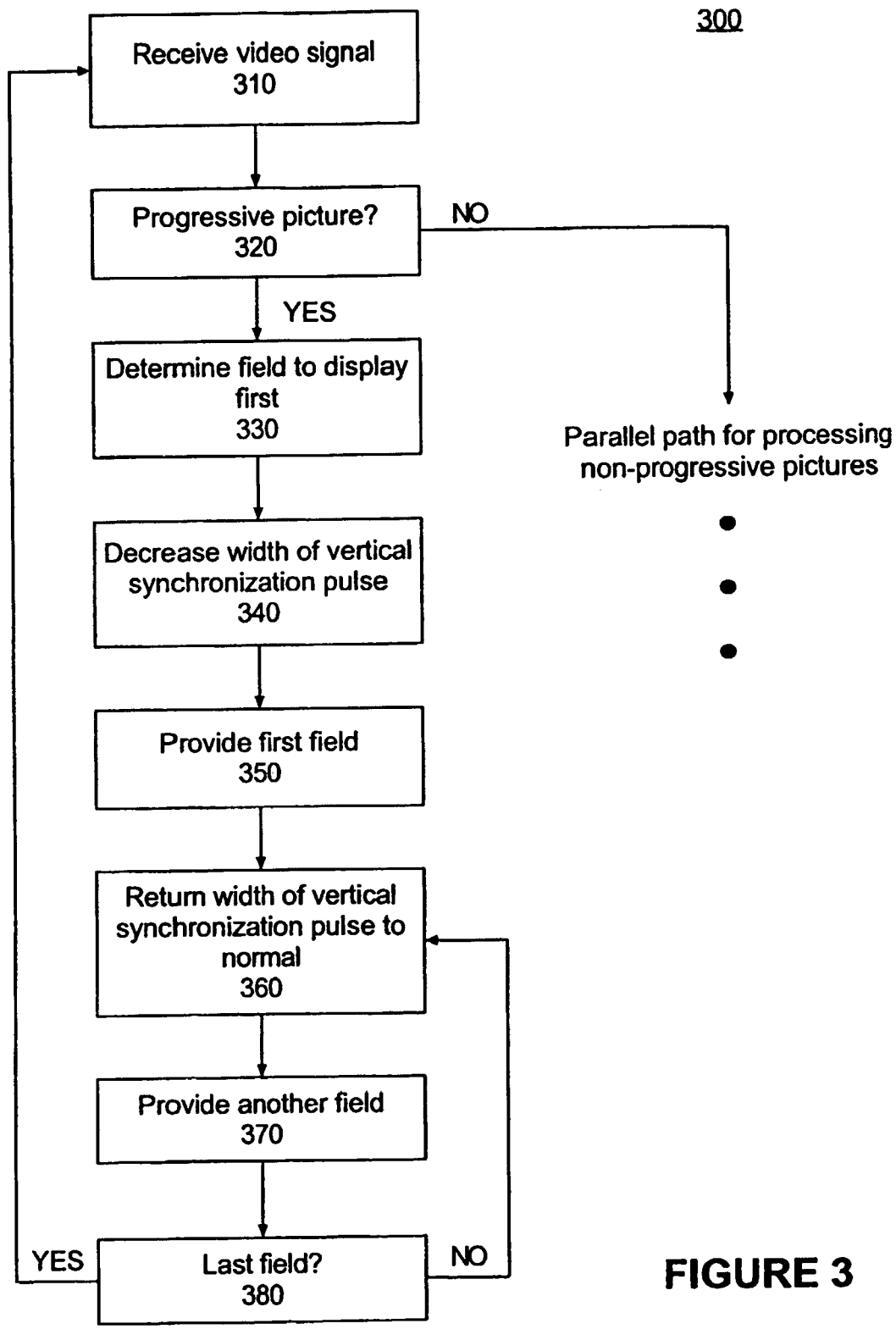
FIG. 3 is a flow chart illustrating an exemplary method for transferring information for use in converting interlaced video to progressive video.

FIG. 3 is a flow chart 300 illustrating an exemplary method for transferring information for use in converting interlaced video to progressive video. The method can begin in step 310 where a video signal containing a picture can be received. In step 320, the received video signal can be analyzed to determine whether the picture contained therein is a progressive picture. An analysis of the pixels of the picture can reveal such information. With regard to an MPEG or an MPEG 2 data stream, the determination can be made by parsing MPEG header information. If the picture is non-progressive, the method can branch to a parallel processing path for processing non-progressive pictures (not shown). If the received picture is progressive, however, the method can continue to step 330.

In step 330, the received picture has been determined to be a progressive picture. Accordingly, a determination can be made as to which field of the received frame is to be displayed first. If an MPEG video data stream has been received, again, this determination can be made by parsing the MPEG header information. In step 340, the vertical sync signal can be modified in accordance with the inventive arrangements disclosed herein. More particularly, the width of the pulse corresponding to the first field of the picture can be decreased to identify the first field. The altered pulse width can serve to indicate initiation of the first field. Still, those skilled in the art will recognize that the vertical sync signal can be pulse width modulated such that the pulse width is increased or decreased. Regardless, the timing of the leading edge of the pulse is preserved.

In step 350, the first field of the received frame can be provided, for example, to an interlace to progressive video processor. In step 360, the pulse width of the vertical sync signal can be returned to normal. The unaltered or normal pulse width can serve as an indication that the second (or a subsequent) field of the frame will be forthcoming. Accordingly, in step 370, the second field of the frame can be provided. After completion of step 370, the method can continue to step 380.

In step 380, a determination can be made as to whether the field just provided in step 370 was the last field of the frame. If so, the method can continue to step 310 and repeat as necessary to process further video signals. If the field was not the last field of the frame, the method can continue to step 360 where the pulse width of the vertical sync signal can remain unaltered and another field of the frame can be provided. The method can repeat steps 360, 370, and 380 as necessary until each field of the frame has been provided.

In accordance with the inventive arrangements disclosed herein, resulting progressive video signals can be provided to an output device. For example, the resulting progressive video signal can be provided to an HDTV receiver having an LCOS display. The invention disclosed herein can be embodied in other specific forms without departing from the spirit or essential attributes thereof. Accordingly, reference should be made to the following claims, rather than to the foregoing specification, as indicating the scope of the invention.

What is claimed is:

1. A method of converting interlaced video to progressive video, said method comprising:

receiving a video signal representative of at least one picture;

determining whether said picture is progressive;

modifying a vertical synchronization signal to identify a first field of said picture responsive to said progressive picture determination, wherein at least two fields are associated with interlaced video; and, processing said video signal responsive to said modifying step wherein during said modifying step at least one of the following is performed:

selectively modulating a pulse width of said vertical synchronization signal wherein said modulation is capable of being used to identify said first field;

increasing a pulse width in a pulse width modulated signal representing the vertical synchronization signal wherein said modulated pulse width is capable of being used to identify said first field; and decreasing a pulse width in a vertical synchronization signal wherein said decreased pulse width is capable of being used to identify said first field.

2. The method of claim 1, wherein said processing step comprises: converting said progressive video signal to an interlaced video signal having said vertical synchronization signal.

3. The method of claim 2, wherein said processing step comprises:

converting said interlaced video signal having said vertical synchronization signal to a progressive video signal in accordance with said modified vertical synchronization signal.

4. The method of claim 3, further comprising: providing said progressive video signal to a liquid crystal on silicon imager.

5. The method of claim 3, further comprising: providing said progressive video signal to a high definition television receiver having a liquid crystal on silicon imager.

6. The method of claim 1, wherein said picture further comprises a second field identified by said vertical synchronization signal, wherein a width of said vertical synchronization signal is unmodified and corresponds to a second field.

7. The method of claim 1, wherein said video signal is a digital video data stream.

8. The method of claim 7, said determining step comprising: parsing header information in said received video data stream.

9. The method of claim 7, said identifying step comprising: parsing header information in said received video data stream.

10. The method of claim 1, wherein said video signal is a Moving Picture Experts Group (MPEG) video data stream.

11. The method of claim 1, wherein said video signal is a Moving Picture Experts Group (MPEG) 2 video data stream.

12. A method of converting interlaced video to progressive video, said method comprising:

receiving a Moving Picture Experts Group (MPEG) 2 video data stream representative of at least one picture;

determining whether said picture is progressive;

identifying a first field of said picture in accordance with a progressive determination of said picture;

selectively modulating a width of a vertical synchronization signal associated with said first field;

converting said MPEG 2 video data stream to an interlaced video signal having said selectively pulse width modulated vertical synchronization signal; and, converting said interlaced video signal to a progressive signal in accordance with said selectively modulated vertical synchronization signal width.

13. A system for converting interlaced video to progressive video, said system comprising: a decoder for decoding a Moving Picture Experts Group (MEPG) 2 video data stream to produce an interlaced video signal, said MPEG 2 video data stream specifying at least in part a first field of a picture, wherein said decoder further produces a vertical synchronization signal being selectively width modulated to identify said first field;

a deinterlacer, for converting said interlaced video signal to a progressive video signal in accordance with said selectively width modulated vertical synchronization signal; and, a processor for coordinating said decoder and said deinterlacer.

14. The system of claim 13, further comprising: a liquid crystal on silicon imager for displaying said progressive video signal.

15. The system of claim 13, further comprising: a high definition television receiver having a liquid crystal on silicon imager for displaying said progressive video signal.

16. A method for signaling an occurrence when converting interlaced video to progressive video, said method comprising: receiving a video signal representative of at least one picture;

identifying a progressive picture occurrence in said video signal;

modifying a vertical sync pulse duration to mark a first field of said picture responsive to said progressive picture determination;

and, processing said video signal to form a progressive video signal in accordance with said modifying step.

* * * * *